BENJAMIN F. PORTER.

Improvement in Fur Set Boxes.

No. 120,897.  Patented Nov. 14, 1871.

WITNESSES
William Eason
Geo. T. Garrison.

INVENTOR
Benjamin F. Porter

UNITED STATES PATENT OFFICE.

BENJAMIN F. PORTER, OF NASHUA, NEW HAMPSHIRE, ASSIGNOR TO GEORGE T. GARRISON, OF BOSTON, MASSACHUSETTS.

IMPROVEMENT IN FUR-SET BOXES.

Specification forming part of Letters Patent No. 120,897, dated November 14, 1871.

*To all whom it may concern:*

Be it known that I, BENJAMIN F. PORTER, of the city of Nashua, county of Hillsborough and State of New Hampshire, have invented an Improvement in the Manufacture of Paper or Pasteboard Fur-Set Boxes; and I do hereby declare the following to be a full and correct description of the same, reference being had to the accompanying drawing, in which—

Figure 1:
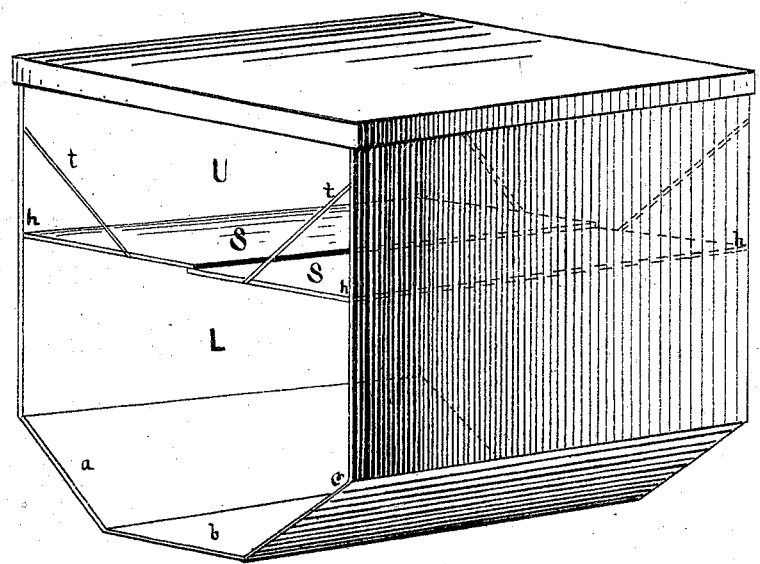
Figure 2:
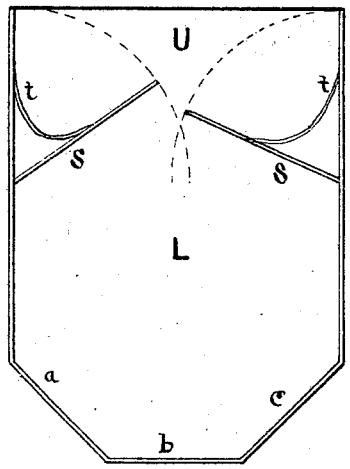

Figure 1 represents a view of such box made according to my invention.

The first part of my invention relates to the shape of the bottom of a fur-set box; and consists in inclining inward the two sides of the box near the bottom so as to form the octagonal bottom *a b c*, which secures the compartment L, suitable for a muff, without a false bottom. The second part of my invention relates to the formation of the compartment U for a collar or boa; and consists in attaching to the inner sides of the box, as *h h*, the two hinged pieces or shelves S S, overlapping each other, which are supported in a horizontal position by tapes *t t* connecting the said pieces with the sides of the box, the said tapes folding behind the movable pieces when the latter are raised.

What I claim is—

The combination, in a fur-set box, of the movable shelves *s s* with the projecting bottom *a b c*, for the purposes of a fur-set box.

The above specification of my invention signed and witnessed at Nashua, New Hampshire, this 8th day of August, A. D. 1871.

BENJAMIN F. PORTER.

Witnesses:
    HENRY B. ATHERTON,
    SUMNER D. MARLAN. (38)